US00RE40536E

(19) United States
(12) Reissued Patent
Jurjavcic

(10) Patent Number: US RE40,536 E
(45) Date of Reissued Patent: Oct. 14, 2008

(54) DEVICE PROVIDING PICTURE VISIBILITY FROM ALL SIDES

(76) Inventor: Damjan Jurjavcic, Beblerjeva 10, 5280 Idrija (SI)

(21) Appl. No.: 10/435,184

(22) PCT Filed: Feb. 5, 1999

(86) PCT No.: PCT/SI99/00003

§ 371 (c)(1),
(2), (4) Date: Nov. 3, 2000

(87) PCT Pub. No.: WO99/41729

PCT Pub. Date: Aug. 19, 1999

Related U.S. Patent Documents

Reissue of:
(64) Patent No.: 6,460,278
Issued: Oct. 8, 2002
Appl. No.: 09/622,467
Filed: Nov. 3, 2000

(51) Int. Cl.
*G09F 11/02* (2006.01)
*G09F 13/02* (2006.01)

(52) U.S. Cl. ..... 40/473; 40/506
(58) Field of Classification Search ..... 40/473, 40/484, 493, 506
See application file for complete search history.

(56) References Cited

FOREIGN PATENT DOCUMENTS

| | | | | |
|---|---|---|---|---|
| DE | 720189 | * 4/1942 | ..... | 40/506 |
| EP | 0357942 | * 3/1990 | | |
| FR | 2679362 | * 1/1993 | | |
| IT | 501388 | * 11/1954 | ..... | 40/473 |
| SI | 9300366 | * 12/1993 | | |
| WO | 8809546 | * 12/1988 | | |

* cited by examiner

*Primary Examiner*—Cassandra Davis
(74) *Attorney, Agent, or Firm*—Abelman, Frayne & Schwab

(57) ABSTRACT

A device for providing object visibility from all sides comprises a cylinder having an opaque surface interrupted by a plurality of transparent sections forming viewing slots elongated in the direction of a longitudinal axis of the cylinder, and a like plurality of objects mounted inside the cylinder, with each object being associated with a viewing slot. The cylinder rotates around the longitudinal axis at a high angular velocity to enable viewing of the object through the slots. The objects can be, for example, an inscription, a picture, a three-dimensional object, a running inscription, a mobile picture, a mobile three-dimensional object or any combination thereof.

7 Claims, 5 Drawing Sheets

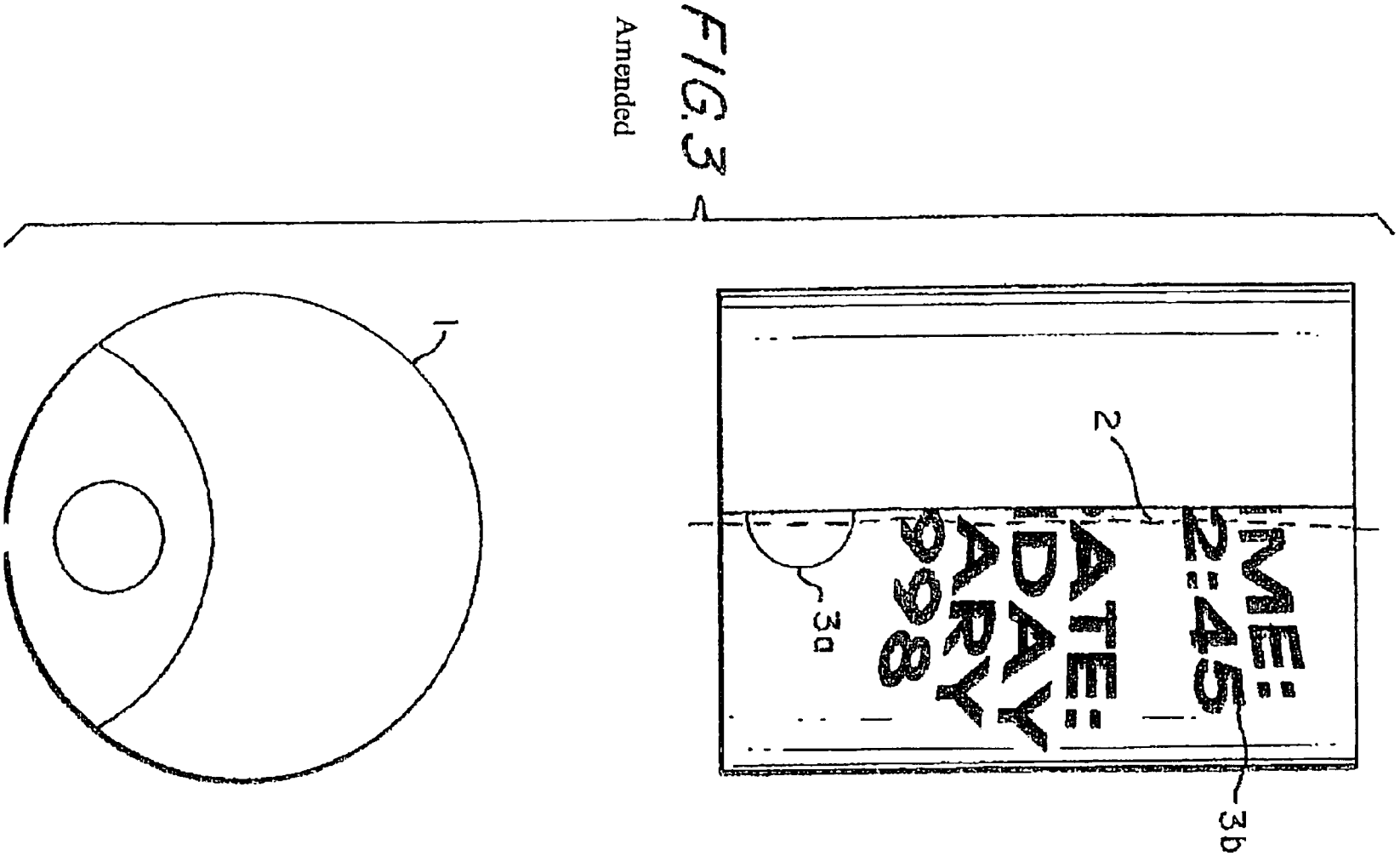
FIG. 3
Amended

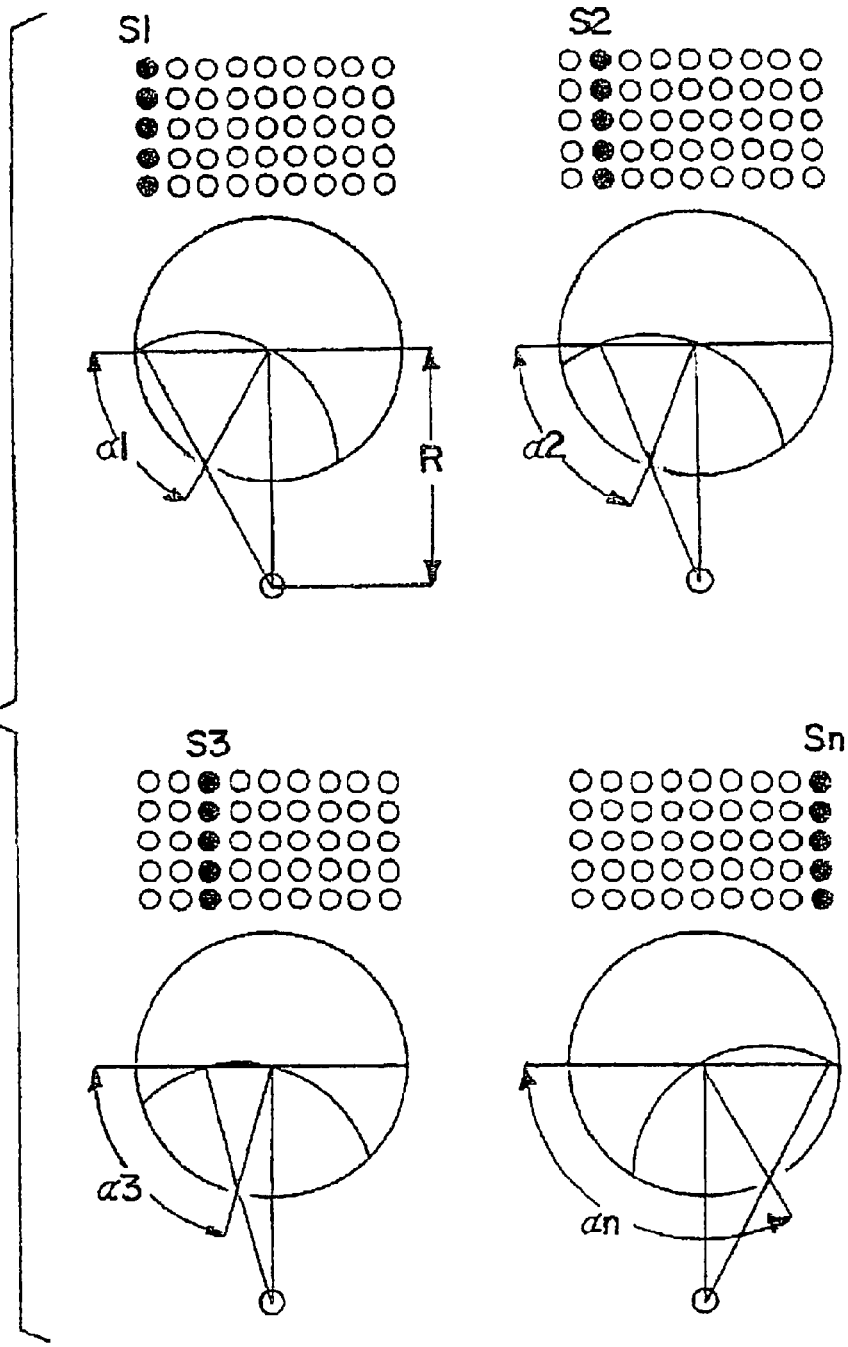
FIG.4
Amended

DEVICE PROVIDING PICTURE VISIBILITY FROM ALL SIDES

Matter enclosed in heavy brackets [ ] appears in the original patent but forms no part of this reissue specification; matter printed in italics indicates the additions made by reissue.

The existing information media, such as advertising panels, illuminated inscriptions on walls and high buildings, LED and LCD displays and TV screens are not visible from all sides but only from a single direction from a specific viewing angle.

The information media which are exposed to several sides, e.g. four-panel boards, are visible from all sides, but the viewer can also see the adjacent information medium, whereas the information is seen from the right angle from certain positions only.

The information media which turn around a vertical axle, e.g. two-panel, three-panel revolving boards, are visible from all sides, but the information is not simultaneously visible from all sides.

As a matter of fact, the device providing picture visibility from all sides, such as referred to in this invention, is a fast rotating opaque cylinder is discontinued lengthwise by a transparent slot, whereby the cylinder rotates at high angular velocity around its axle together with the object. The transparent slot is positioned in front of the object. Depending on the type of the viewed object (two-dimensional object, three-dimensional object), the latter shall be of appropriate design, so that the picture of the object is visible in the desired form.

The device providing picture visibility from all sides, as referred to in this invention, will be explained in detail on the basis of the example and the pictures, whereof FIG. 1 shows the device referred to in this invention, which provides visibility of the identical pictures of the object from all sides, as partial section and as side view;

FIG. 3 shows the diagram of the device referred to in this invention, providing picture visibility of viewed objects in the form of inscription and three-dimensional object, as partial section and side view as well as the respective ground plan;

Figure 5:
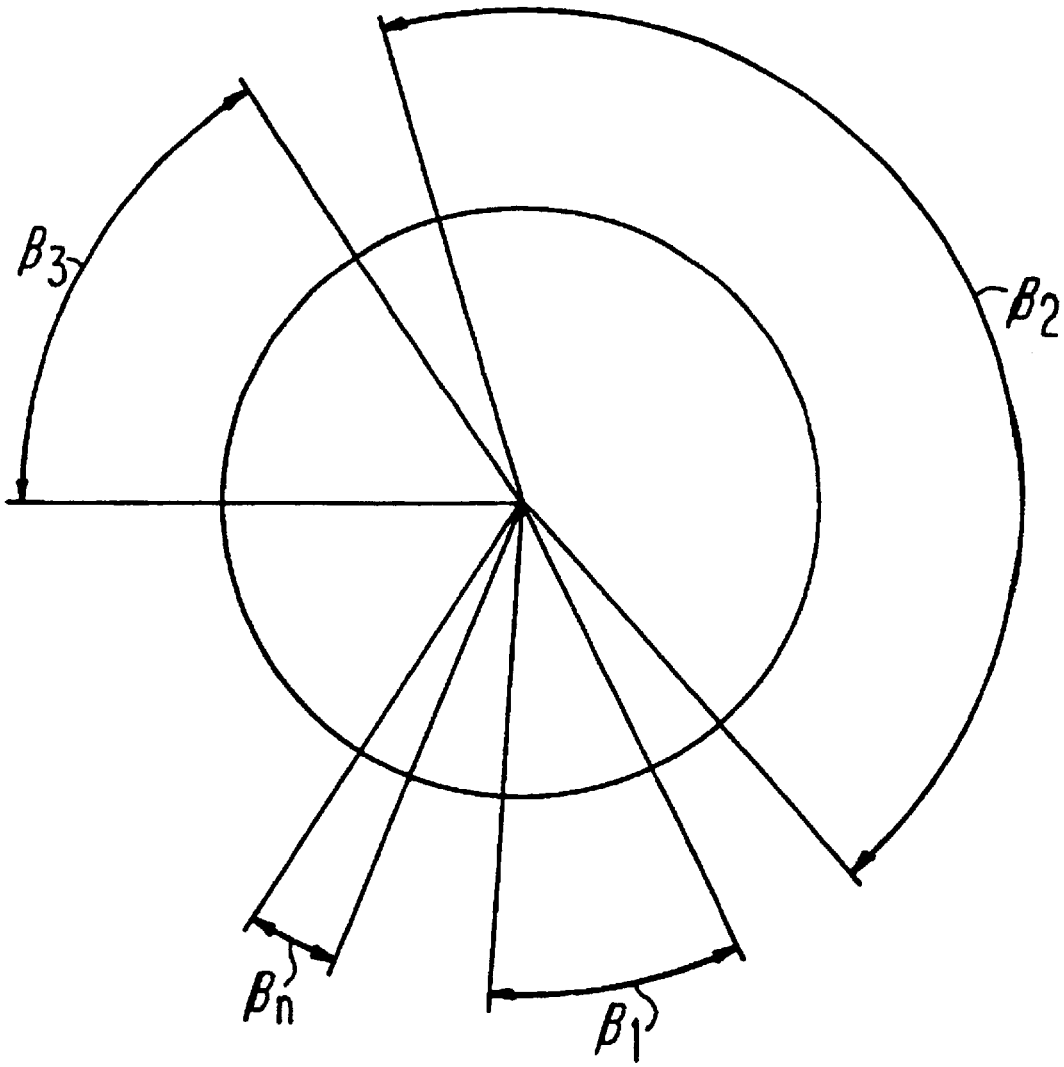

FIG. 4 shows the diagram of the device which provides visibility of the different pictures of the object from different viewing directions, as a ground plan and with reference to display brightness in positions $\alpha 1$, $\alpha 2$, $\alpha 3$ . . . $\alpha n$;

FIG. 5 shows an example of the $\beta 1$, $\beta 2$, $\beta 3$ . . . $\beta n$ viewing angle range, whereby the viewer can see a different picture of the object at every viewing angle.

The device providing picture visibility of an object and/or of several objects from all sides and whereof the basic design is shown in FIG. 3 allows for viewing of a three-dimensional object 3a (static and mobile three-dimensional object) and of a two-dimensional object 3b (inscriptions, pictures, mobile pictures, running inscription) from all sides, with high frequency, identically to all viewers around the device, whenever an opaque cylinder 1 with the object 3 rotates at high angular velocity around its axle; the transparent slot 2 lengthwise discontinuing the opaque cylinder 1 is always located in front of the object 3. The opaque cylinder I may be a dark and non-shiny tube with a cut-out slot 2 or a colourless transparent tube covered with a dark, opaque and non-shiny layer discontinued for the width of the transparent slot 2, or an opaque cylinder 1 discontinued by a transparent slot 2 which during the operation constantly interrupts the opaque cylinder in the way that it is constantly in front of the object 3. Such three-dimensional object 3a as well as the two-dimensional object 3b shall be appropriately shaped. The two-dimensional object 3b, if inscription or picture, must be curved to give a straight picture provided by the device. The three-dimensional object 3b must be deformed to give the desired object picture provided by the device. The curved shape and/or the deformation of the viewed object 3 depends on the distance of the object 3 from the slot 2 as well as on the purpose of the device. With the device in question, designed for remote viewing, the objects 3 are strongly deformed, but with devices designed for viewing at short distances the objects 3 are less deformed.

The width of the slot 2 influences the quality of the picture of the object 3. With a narrow slot 2 the picture of the object 3 is sharp enough, but less bright. With a wide slot 2 the situation is, however, just the opposite.

To provide a high frequency (not blinking) picture of the object it is necessary to increase the frequency of the device itself, which can be achieved by increasing the number of revolutions or by increasing the number of transparent slots and identical objects 3.

The objects 3 under observation may be real objects (a two-dimensional inscription 3b fixed to the structure; a three-dimensional object 3a fixed to the structure of the device) or apparent objects (object 3 as a holographic projection; object 3 is apparent, its visibility can be achieved on the optical level, with mirrors, prisms, lenses etc.).

The objects 3 under observation shall be bright enough. They may be well illuminated or they radiate light themselves. The brightness of objects 3 shall be a high-frequency one or constant on a micro time interval.

Figure 1:
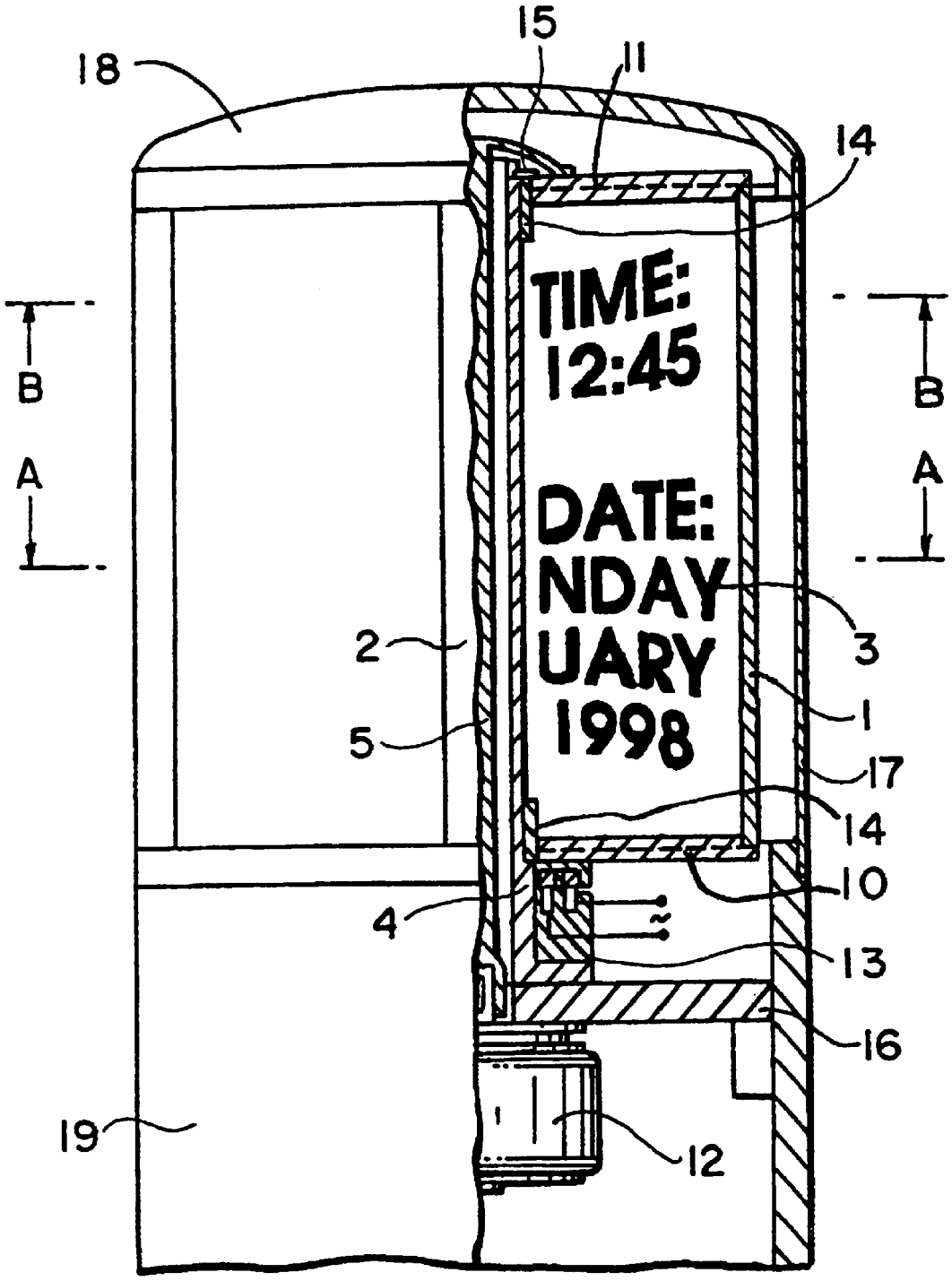
Figure 2:
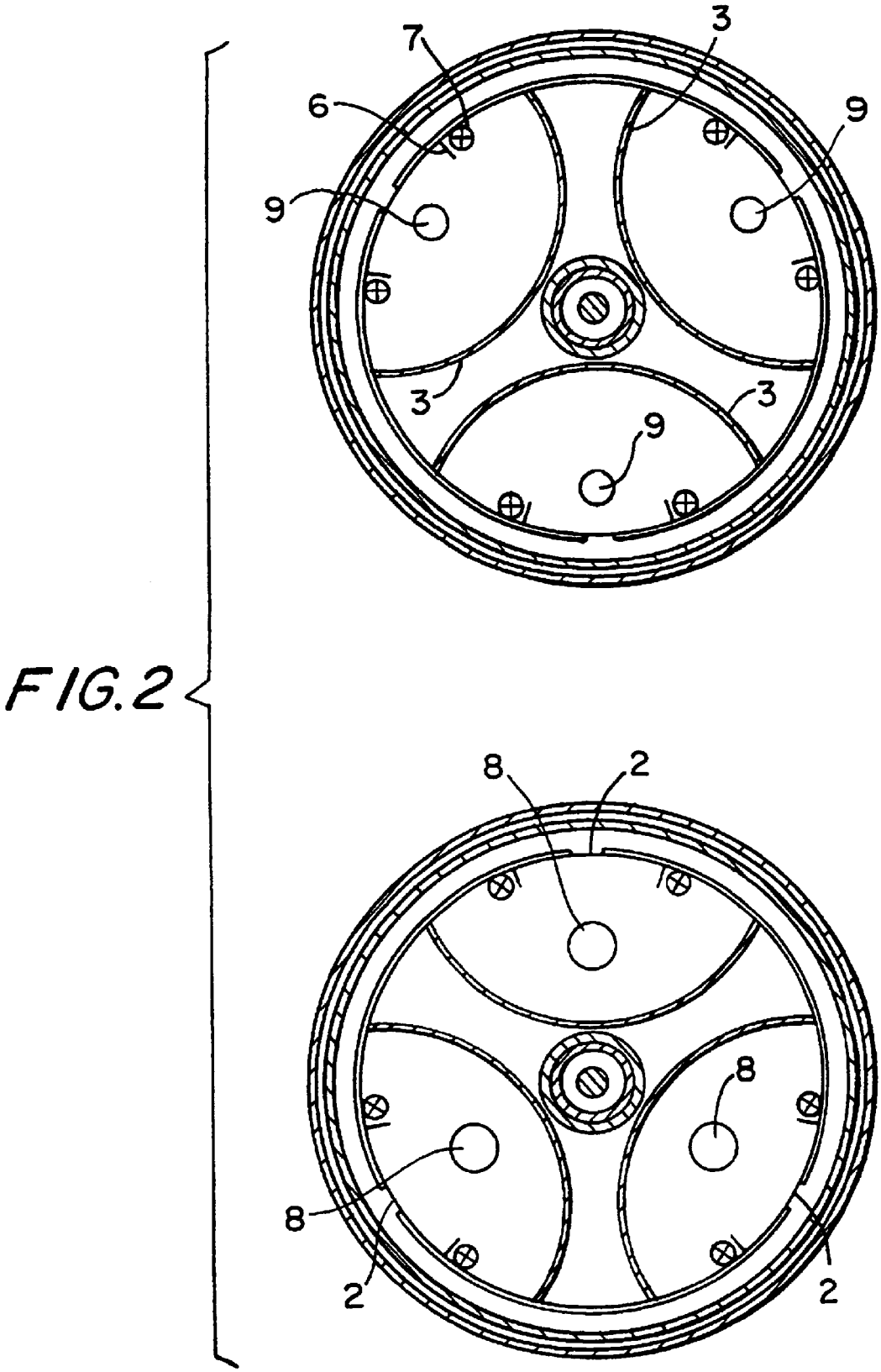
FIG. 2 shows the device referred to in this invention, which provides visibility of the identical pictures of the object from all sides, as sections A—A and B—B.

FIGS. 1 and 2 show an example of the structure of the device referred to in this invention, which consists of a fast rotating rotor, a driving unit, an electric system which enables transmission of electric current to the rotor and to the housing of the device.

The rotor consists of a dark non-shiny tube with three transparent slots 2, three curved two-dimensional objects 3 with inscription, cover 10 and 11, slip rings and wires for electric current transmission to light sources 7, which makes the electric system 13 in the rotor, bearing 14, lamellas 6 and light sources 7.

The rotor is assembled in the way that the tube 1 and the two-dimensional objects 3 fit tightly into the grooves of the covers 10 and 11. The slip rings of the electric system 13, the lamellas 6 and the light sources 7 are fixed to the rotor structure, whereas the bearings 14 are pressed into the covers 10 and 11. The transparent slots 2 are positioned in front of the objects 3.

The rotor rotates on the axle 4 on bearings 14 and is axially blocked with a axial clamp ring 15. The rotor is driven via the shaft 5 by the electromotor 12. The shaft 5 is fixed by screw to the cover 11, whereas on the shaft of the electromotor 12 it is protected against distortion with a wedge.

The plate 16 is fixed by screw to the base 19. The electromotor 12, the axle 4 and the brushes of the electric system 13 are fixed by screw to the plate 16.

The protective external transparent tube 17 is mounted and fixed by screw to the housing 19 and cover 18.

The dark non-shiny tube 1 may be provided with cut-out slots 2 or the transparent tube is covered with a dark, opaque, non-shiny layer, discontinued for the width of the transparent slot 2.

The width of the slot 2 influences the quality of the picture of the object 3. If the slot 2 is narrow, the picture of the object is sharp enough, but its brightness is worse. With a wide slot 2 the situation is just the opposite.

The two-dimensional object 3 is illuminated by light sources 7. The illumination of the object 3 may be increased by application of an internal chrome coating of the tube 1, which provides less heating of the tube 1 due to light sources 7.

Internal cooling of the device referred to in this invention, which is heated by the light sources 7, is achieved with objects 3, with boreholes 8 on the lower cover 10 and with boreholes 9 on the upper cover 11. The boreholes 8 are located at a different distance from the rotor axle than the boreholes 9.

The width of the visible part of the picture of the viewed object 3 is limited with lamellas 6.

To provide a high frequency (not blinking) picture of the inscription on the object 3, the device shall operate at sufficient frequency. In the case explained this can be achieved with three transparent slots 2, with three two-dimensional objects 3 and with a sufficiently high number of revolutions of the electromotor 12.

The transmission of electric current to the rotating part of the device is effected through the electric system 13, which consists of brushes, electric installation and slip rings.

The safety of the device can be achieved with a safety transparent tube 17.

FIG. 4 shows the diagram of the device which allows for high-frequency display of different pictures of object viewed by viewers standing around the device. Such pictures of the objects 3 are different, depending on the viewers' positions around the device. Object 3 is the electronic display.

The electronics of the displayed object 3—the electronic display shall operate in the way that at an angle a1 the first column of the display S1 lights up, at the angle $\alpha$2 the second column of the display S2 lights up, at the angle $\alpha$3 the third column of the display S3 lights up, at the angle $\alpha$n . . . the nth column of the display Sn lights up. Then the display is visible only in one direction and the column shall be lit for a certain time interval only. The cycle of consecutive lighting up of the first, the second . . . the nth column makes up the desired picture of the object which the viewer can see as a true, non-blinking picture.

The time interval of column brightness determines the viewing angle $\beta$ under which the picture of the object is still visible with reference to the original direction.

The angle $\beta$ may be of different size, yet within such limits that the display can be visible as whole. By changing the viewing distance R, the viewed picture of the display becomes curved, which results in visibility of only a certain width of the display picture. The above problems can be avoided with a sufficient angle $\beta$ and a display depending on the viewing distance, whereof the consequence is a limited number of different display pictures exposed to viewing.

At viewing beyond the angle $\beta$, the viewer can see a new display picture. FIG. 5 shows the viewing angle ranges $\beta$1, $\beta$2, $\beta$3, . . . $\beta$n, in which the viewer can see the picture of the object 3 which may be different from every viewing angle.

What is claimed is:

1. A device for providing object visibility from all sides, the device comprising:

a cylinder having an opaque surface interrupted by a plurality of transparent sections forming viewing slots elongated in the direction of a longitudinal axis of said cylinder;

a like plurality of objects mounted to said cylinder interiorly thereof, each of said objects being associated with one of said viewing slots; and structure mounting said cylinder for rotation thereof around the longitudinal axis at a high angular velocity to enable viewing of said objects through said slots.

2. The device of claim 1, wherein said plurality is three and said objects are identical.

3. The device of claim 2, *wherein* each said object is one of an inscription, a picture, a three-dimensional object, *a display of* a running inscription, a mobile picture, a mobile three-dimensional object and any combination thereof.

4. The device of claim 3, wherein each said object is deformed from a shape in which it is to appear through said slots in said rotating cylinder.

5. The device of claim 1, wherein said cylinder is one of (*a*) a tube made of a dark, non-shiny material with cutouts therein forming said slots and (*b*) a colorless transparent tube covered with a dark, non-shiny material in regions between said slots.

6. The device of claim 5, wherein:

said cylinder includes a top cover and a bottom cover secured to said tube [with screws];

said covers have boreholes therethrough for permitting the circulation of air through said cylinder as it rotates; and said structure includes a frame and an electric motor mounted to said frame and having an axle for rotating said cylinder in bearings.

7. A *display* device [for providing object visibility from all sides, the device] comprising:

a cylinder having an opaque surface interrupted by a [plurality of] transparent [sections] *section* forming *a* viewing [slots] *slot* elongated in the direction of a longitudinal axis of said cylinder;

an electronic display mounted to said cylinder interiorly thereof, said display including a plurality of selectively illuminated columns $S_1$, $S_2$, . . . [$S_N$] $S_n$ viewable through said viewing slot;

structure mounting said cylinder for rotation thereof around the longitudinal axis at a predetermined angular velocity to enable successive viewing of said columns of said electronic display through said slot; and circuitry for operating said electronic display to illuminate said columns of said display in sequence, with said column $S_1$ of said display being illuminated when an angle $\alpha_1$ is formed between a viewer and said slot, said column $S_2$ of said display being illuminated when an angle $\alpha_2$ is formed between a viewer and said slot, until said column $S_n$ of said display is illuminated at an angle $\alpha_n$ between a viewer and said slot, wherein each column of said display is illuminated for a time interval such that said display is visible only in one direction at a viewing angle $\beta$ partially around a circumference of said cylinder.

* * * * *